United States Patent
Buchko et al.

(10) Patent No.: US 8,144,714 B1
(45) Date of Patent: Mar. 27, 2012

(54) ASSURED DELIVERY MESSAGE SYSTEM AND METHOD

(75) Inventors: Steven Buchko, Dunrobin (CA); Shawn McAllister, Manotick (CA); Greg Bertin, Ottawa (CA); Jules d'Entremont, Nepean (CA)

(73) Assignee: Solace Systems Inc., Kanata, ON (CA)

( * ) Notice: Subject to any disclaimer, the term of this patent is extended or adjusted under 35 U.S.C. 154(b) by 1138 days.

(21) Appl. No.: 11/739,468

(22) Filed: Apr. 24, 2007

Related U.S. Application Data (60) Provisional application No. 60/745,456, filed on Apr. 24, 2006.

(51) Int. Cl.
*H04L 12/28* (2006.01)

(52) U.S. Cl. ........ 370/396; 370/229; 370/235; 370/351; 370/389; 370/390; 370/392; 370/394; 370/395.4; 370/419; 370/428; 370/429; 709/204; 709/226

(58) Field of Classification Search .......... None
See application file for complete search history.

(56) References Cited

U.S. PATENT DOCUMENTS

| | | | | |
|---|---|---|---|---|
| 5,596,318 | A * | 1/1997 | Mitchell | 340/7.22 |
| 6,760,340 | B1 * | 7/2004 | Banavar et al. | 370/408 |
| 6,831,912 | B1 * | 12/2004 | Sherman | 370/349 |
| 6,925,482 | B2 * | 8/2005 | Gopal et al. | 709/201 |
| 6,980,518 | B1 * | 12/2005 | Sun et al. | 370/235 |
| 2005/0078660 | A1 * | 4/2005 | Wood | 370/352 |
| 2006/0129650 | A1 * | 6/2006 | Ho et al. | 709/207 |

* cited by examiner

*Primary Examiner* — Jason Mattis
*Assistant Examiner* — Aixa A Guadalupe
(74) *Attorney, Agent, or Firm* — Marks & Clerk; Richard J. Mitchell (57) ABSTRACT

In method of providing assured message delivery across a distributed message delivery system with low delivery latency and network traffic, a set of destinations is first identified for a set of destinations for a message received at an ingress router to the network. The received message is stored in persistent storage along with meta-data about each destination for the message before the message is routed to each identified destination. The message is only removed from persistent storage when an acknowledgement has been received from each destination indicating that the message has been successfully received.

17 Claims, 7 Drawing Sheets

```
<ACK>
    <ackRtr id=" ROUTER_ENDPOINT:HTTP:192.168.1.1:8080"/>        — 212
    <rtr id="ROUTER_ENDPOINT:HTTP:192.168.1.2:8080">
        <persist>                      — 205
            <pri val="1">                          — 214
                <lastIdx>1234</lastIdx>
            </pri >
                                       — 206
            <pri val="2">
                <lastIdx>2231</lastIdx>
            </pri >
            <pri val="3">
                <lastIdx>26874</lastIdx>
            </pri >
            <pri val="4">
                <lastIdx>36</lastIdx>
            </pri >
        </persist>
        <nonPersist>
            <pri val="1">
                <lastIdx>9973</lastIdx>
            </pri >
            <pri val="2">
                <lastIdx>4</lastIdx>
            </pri >
            <pri val="3">
                <lastIdx>1127</lastIdx>
            </pri >
            <pri val="4">
                <lastIdx>33789</lastIdx>
            </pri >
        </nonPersist>
    </rtr >
    <rtr id="ROUTER_ENDPOINT:HTTP:192.168.1.17:8080">
        <persist>
            <pri val="1">
                <lastIdx>6684</lastIdx>
            </pri >
            <pri val="2">
                <lastIdx>3</lastIdx>
            </pri >
            <pri val="3">
                <lastIdx>951472</lastIdx>
            </pri >
            <pri val="4">
                <lastIdx>3327</lastIdx>
            </pri >
        </persist>
        <nonPersist>
            <pri val="1">
                <lastIdx>6552</lastIdx>
            </pri>
            <pri val="2">
                <lastIdx>6667</lastIdx>
            </pri>
            <pri val="3">
                <lastIdx>678</lastIdx>
            </pri>
            <pri val="4">
                <lastIdx>44785</lastIdx>
            </pri>
        </nonPersist>
    </rtr >
</ ACK >
```

Fig. 5

```
    <OORequest>
        <reqRtr id=" ROUTER_ENDPOINT:HTTP:192.168.1.1:8080"/>
301 ──── <rtr id="ROUTER_ENDPOINT:HTTP:192.168.1.2:8080">
302 ────    <persist>                  ──── 306
    303 ────   <pri val="1">                ──── 307
        305 ────   <lastIdx>1234</lastIdx>
                   <firstOOIdx>1237</firstOOIdx>
                                           ──── 308
                </pri>
            </persist>
            <nonPersist>
304 ────    <pri val="3">
    305 ────   <lastIdx>1127</lastIdx>
                <firstOOIdx>1174</firstOOIdx>
                </pri>
            </nonPersist>
        </rtr>
    </OORequest>
```

ASSURED DELIVERY MESSAGE SYSTEM AND METHOD

CROSS REFERENCE TO RELATED APPLICATION

This application claims the benefit under 35 USC 119(e) of prior U.S. provisional application No. 60/745,456, filed Apr. 24, 2006, the contents of which are herein incorporated by reference.

FIELD OF THE INVENTION

This invention relates to data communication networks and in particular to a method of assured message delivery across a distributed message delivery system with low delivery latency and network traffic.

BACKGROUND OF THE INVENTION

In the prior art, many message delivery systems exist which offer assured message delivery between endpoints, such as between different applications. Assured (sometimes also called guaranteed or persistent) message delivery offers a once and only once message delivery semantics, although other delivery semantics can also be offered as well, such as deliver at most once, deliver at least once, etc.

Such messaging systems provide for loosely coupled message delivery between the message source and the receiving application (for one-to-one delivery) or receiving applications (for one-to-many delivery). A receiving application may be offline when a message is sent, and the messaging system must persist the message and deliver it to the application when it becomes available. As well, the system ensures message delivery to the receiving application even in the presence of message loss between network elements, as may occur due to events such as communications errors, power outages, etc.

Examples of prior art messaging systems are WebSphere MQ from International Business Machines Corporation and a number of implementations of the Java Messaging Service (JMS) which is known in the art.

In prior art assured delivery systems, messages can be sent by a message source to a destination message queue or to a destination topic group. A destination queue is suitable for one-to-one message delivery. Note however that multiple applications can receive messages from a destination queue, e.g. for load balancing or resiliency, but a given message is only received by one application from the queue. With publish-subscribe style message delivery, a message is published to a topic, and can be received by one or more applications that subscribe to messages from that topic. Some messaging systems such as JMS also allow for "message selectors" to allow for filtering of the messages based on matching rules on certain header fields so that an application can, for example, receive a subset of the messages from a topic based on the message selector filtering rules.

In order to provide assured message delivery in the face of any type of failure, including loss of power, the restart of the messaging system etc., messages must be persisted to non-volatile storage. Typically disk drives are utilized due to the large message volume and the requirement to be able to persist messages for a long period of time, e.g. when the destination for the message is not available. In order to provide for assured delivery, the message must be guaranteed to be in non-volatile storage before the message sender is sent an acknowledgement that the message has been accepted by the messaging system. The act of storing the message adds significant latency to the processing of the message at a message processing node, and even with non-volatile caches, the message latency and throughput is significantly affected by this requirement.

While a messaging system can utilize a simple hub and spoke model, for scaleable deployments a distributed network of messaging systems is typically needed. Thus, a message may flow through multiple messaging system hops on its way from the message source to the one or many messages consumers. In the prior art, the message is stored to disk at each messaging system along the path as the message makes its way from the source to the destination(s). This requires significant processing resources at each messaging hop, and each messaging hop significantly increases the messages latency.

Another type of reliable message delivery is offered by systems that offer reliable multicast delivery. Such systems typically utilize protocols such as IP multicast to deliver messages from a source to many recipients, and allows for lost message delivery (e.g. due to a dropped muticast packet). As an example, U.S. Pat. No. 6,980,518, a reliable multicast message delivery system based on the "GOSSIP" technique is described, in which messages are logged so that a re-transmission can be requested if a given endpoint has lost a message. Such techniques require each message recipient to be able to know the other members of a messaging group (such as an IP multicast group), such that in message loss scenarios, a group member can ask another random group member for the missing message. U.S. Pat. No. 6,980,518 also uses special message loggers that persist messages for longer periods (until all group members have acknowledged receiving the message), but such loggers must be able to determine every recipient of the message. This technique can work for simpler distribution methods such as multicast group membership, but does not work for complex message distribution scenarios, such as those utilizing content-based routing, where the message contents determine the set of recipients on a message-by-message basis, as opposed to IP multicast group membership or subscriptions to topics. U.S. Pat. No. 6,980,518 can also not guarantee reliable delivery of the message if the sender crashes before a new message being sent arrives at a logger node.

U.S. Pat. No. 6,925,482 describes a system and method allowing businesses to send electronic messages or other information to conduct business over a digital network such as the Internet. This system utilizes redundant communication networks (i.e. every message is transmitted twice) to provide resiliency, as well as as route point processors which archive messages to ensure message delivery. This invention is not suitable for high speed messaging networks since each message is sent twice across disparate networks, which consumes double the network bandwidth. Additionally, the invention only handles point-to-point messages exchanges. If a message is to be consumed by an arbitrary number of recipient applications, each destination applications is sent a separate copy of the message, and each separate copy of the message is archived independently.

It is highly desirable to provide a messaging system which can offer assured message delivery, in which a distributed approach is offered to allow for a highly scalable messaging solution, and at the same time, an approach to assured delivery is offered which allows for minimum messaging latency and maximum possible message throughput. It is also highly desirable that such a system support both one-to-one and one-to-many message delivery scenarios, as well as supporting content-based routing, where the content of each message determines the set of recipients, as opposed to message delivery based on destination address, or topic subscription, or IP multicast group membership, etc.

SUMMARY OF THE INVENTION

According to the present invention there is provided a method of providing assured message delivery in a network, comprising identifying a set of destinations for a message received at an ingress router to the network; storing the received message in persistent storage along with meta-data about each destination for the message; attempting to route the message to each identified destination; awaiting an acknowledgement at the ingress router from each identified destination indicating that the message has been successfully received thereby; and removing the message from persistent storage when an acknowledgement has been received from each destination identified for the message. The destinations can either be destination egress router(s) or ultimate destination clients.

The persistent storage medium is typically associated with the ingress router, although in an alternative embodiment it may be shared by two or more ingress routers, and possibly the egress router. No persistent storage is required at intermediate routers through which the message passes.

In accordance with the invention the message is stored locally in persistent storage at or close to the ingress router until an acknowledgement has been received from all the destinations so that if a failure occurs the message remains available for resending.

In one embodiment, when a message arrives at an egress router, the egress router checks to identify the local destinations for the message. The message is then placed in volatile storage along with the destination list. As the acknowledgments are received from the destination clients, these clients are removed from the list in volatile storage. When all the acknowledgements have been received from the local clients, an acknowledgement message is sent back to the sending router and the message is removed from the volatile storage. If acknowledgements are not received from the destination clients within a set period of time, the message and remaining destination list is moved to persistent storage. This arrangement minimizes latency when the acknowledgements are received promptly and is fail-safe since no acknowledgement is sent back to the sending router until all the acknowledgements have been received. If a failure occurs before the messages have been delivered the sending router will not receive an acknowledgement, and will now to resend the message, which in its case is in persistent storage.

In another embodiment the egress router can immediately place the message in non-volatile storage and send an acknowledgement straight back to the ingress router. This frees up resources at the ingress router once the message has been delivered to the egress router.

In another aspect the invention provides a communications network comprising a plurality of interconnected routers, at least some of which are attached to local clients, and a persistent storage medium associated with one or more of said routers acting as ingress routers. Each ingress router has a processor programmed to identify a set of destinations for a message received at that ingress router, store the received message in persistent storage along with meta-data about each destination for the message, attempt to route the message to each identified destination, await an acknowledgement at the ingress router from each identified destination indicating that the message has been successfully received thereby, and remove the message from persistent storage when an acknowledgement has been received from each destination identified for the message.

BRIEF DESCRIPTION OF THE DRAWINGS

The invention will now be described in more detail, by way of example only, with reference to the accompanying drawings, in which:—

FIG. 5 shows the format for the acknowledgement message sent between message routers;

DETAILED DESCRIPTION OF THE PREFERRED EMBODIMENTS

Figure 1:
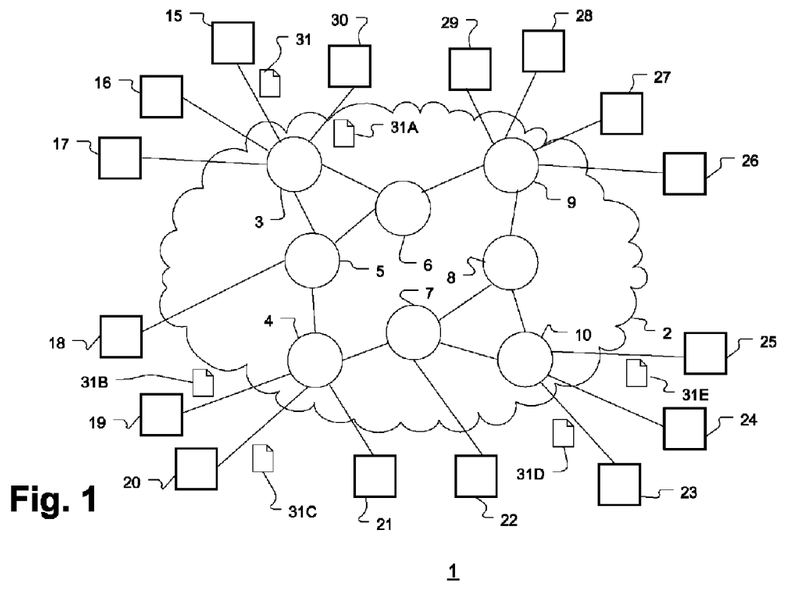
FIG. 1 shows an example message network providing assured message delivery service.

FIG. 1 shows an example system 1 which consists of a message delivery network 2 which is providing a scaleable, distributed assured message delivery service, as well as clients for the service. Network 2 consists of message delivery routers 3 through 10 which can be flexibly deployed in various different networks topologies, with an example topology shown in FIG. 1. An example of a device which can serve as a router 3 through 10 is the VRS/32 Value-Added Services Routing System from Solace Systems, Inc. Note that routers 3 through 10 may be deployed as an overlay to an underlying network, such as an IP/MPLS network, or other communications networks as is known in the art. Connected to network 2 is a plurality of messaging applications or clients 15 through 30, which may be any type of device or software which wishes to send and receive messages, with the message delivery to the one or more recipients being assured by network 2. Note that while only a small number of clients is shown, such a delivery network can support a large number of clients, such as millions, and can scale to a large number of message routers.

FIG. 1 also shows an example of a message 31 being submitted by client 15. This example message results in a copy 31A being delivered to client 30, a copy 31B being delivered to client 19, a copy 31C being delivered to client 20, a copy 31D being delivered to client 23, and a copy 31E being delivered to client 25.

The message 31 can be routed to the set of interested destinations based on destination queues or topics as is known in the art, but preferentially is routed based on the content of the message using content routing techniques. An example of a method for content routing of messages is detailed in U.S. application Ser. No. 11/012,113 (PCT application PCT/CA2004/002157), the contents of which are incorporated herein by reference. As a short summary of the routing method detailed in this reference, the inbound router 3, upon receiving message 31, determines the set of local clients interested in the message (client 30), as well as the set of remote message routers interested in the message (4 and 10). When the message is sent onwards to message router 4 and 10, a shared copy of the message may be forwarded upon common routes. In the example of network 2, the preferential route to routers 4 and 10 from router 3 is via router 5, so a single copy of message 31 is sent towards router 5, indicating a destination list of router 4 and 10. Router 5, upon receiving the message, sees that it is not in the destination list for the message, and so simply forwards the message onwards towards routers 4 and 10, with the route to both being via the link to router 4. Upon receiving the message, router 4 can immediately forward the message onwards to router 10 (via router 7), after removing itself from the destination list, and then, since router 4 appears in the destination list, router 4 can process the message for delivery to interested local clients (19 and 20). Router 7 simply forwards the message onwards to router 10. Router 10 processes the message since it is in the destination list, and will send the message to interested clients 23 and 25.

Figure 2:
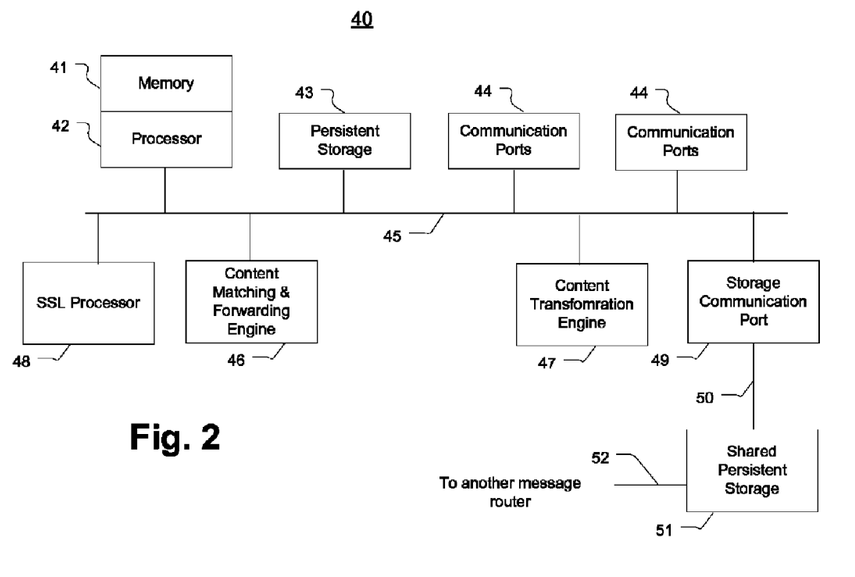
FIG. 2 shows a block diagram of a device that may be used in this invention.

FIG. 2 shows a block diagram of an exemplary device 40 (representing a device such as an individual message router from the set of 3 through 10) of the present invention, which includes a (or many) central processing unit (CPU) 42 with associated memory 41, persistent storage 43, a plurality of communication ports 44 (which may just do basic input/ output functions, leaving the protocol processing to CPU 42, or which may have specialized processors such as networks processors or other hardware devices to do protocol processing as well, such as IP processing, UDP or TCP processing, HTTP processing, etc), and a communication bus 45. Either integrated into communications port network processors 44, or CPU 42 or a separate device off the communication bus 45 is a SSL termination processor 48. For an example application of content routing, the processor 42 is responsible for tasks such as running content routing protocols XLSP and XSMP (as per U.S. application Ser. No. 11/012,113), computing routing tables, processing received documents or messages and routing them based on content (which may involve specialized hardware assist 46 which is outside the scope of this invention), transforming the content of messages from one format to another (which may involve specialized hardware assist 47 which is outside the scope of this invention), carryout out the logic to ensure assured message delivery, and other router tasks known in the art. The associated memory 41 is used to hold the instructions to be executed by processor 42 and data structures such as message routing tables and protocol state. The persistent storage 43 is used to hold configuration data for the router, event logs, programs for the processor 42, as well as to hold state required for assured message delivery. The persistent storage 43 (also called non-volatile storage) may be redundant hard disks, flash memory disks or other similar devices. The communication ports 44 are the ports which the router uses to communicate with other devices, such as other routers and hosts (messaging clients). Many different technologies can be used, such as Ethernet, Token Ring, SONET, etc. The communications bus 45 allows the various router components to communicate with one another, and may be a PCI bus (with associated bridging devices) or other inter-device communication technologies known in the art.

Optionally, shared persistent storage (also called shared non-volatile storage), which is shared among two or more message routers which are acting to back each other up to provide redundancy, may also be utilized. In this case, a storage communication port 49, utilizing technology such as Fiber Channel, SCSI, Ethernet, etc. An external, shared persistent storage, 51, connected over link 50, can be used to store shared state, such as assured messages and their state information. Storage 51 is connected to one or more other message routers (e.g. via link 52), and thus if a message router completely fails, the shared storage 51, and the assured messages stored on it, is not affected.

If shared persistent storage 51 is not utilized, then when an assured message and its state information is written to storage 43 in a message router, the same information is preferentially synchronized with a backup message router, so that in the case of the complete failure of a message router, the backup message router can take over and continue to take care of the assured message(s) from the failed router.

Refer to U.S. application 60/696,790, the contents of which are incorporated herein by reference, for a technique of router redundancy in message routing networks.

Figure 3:
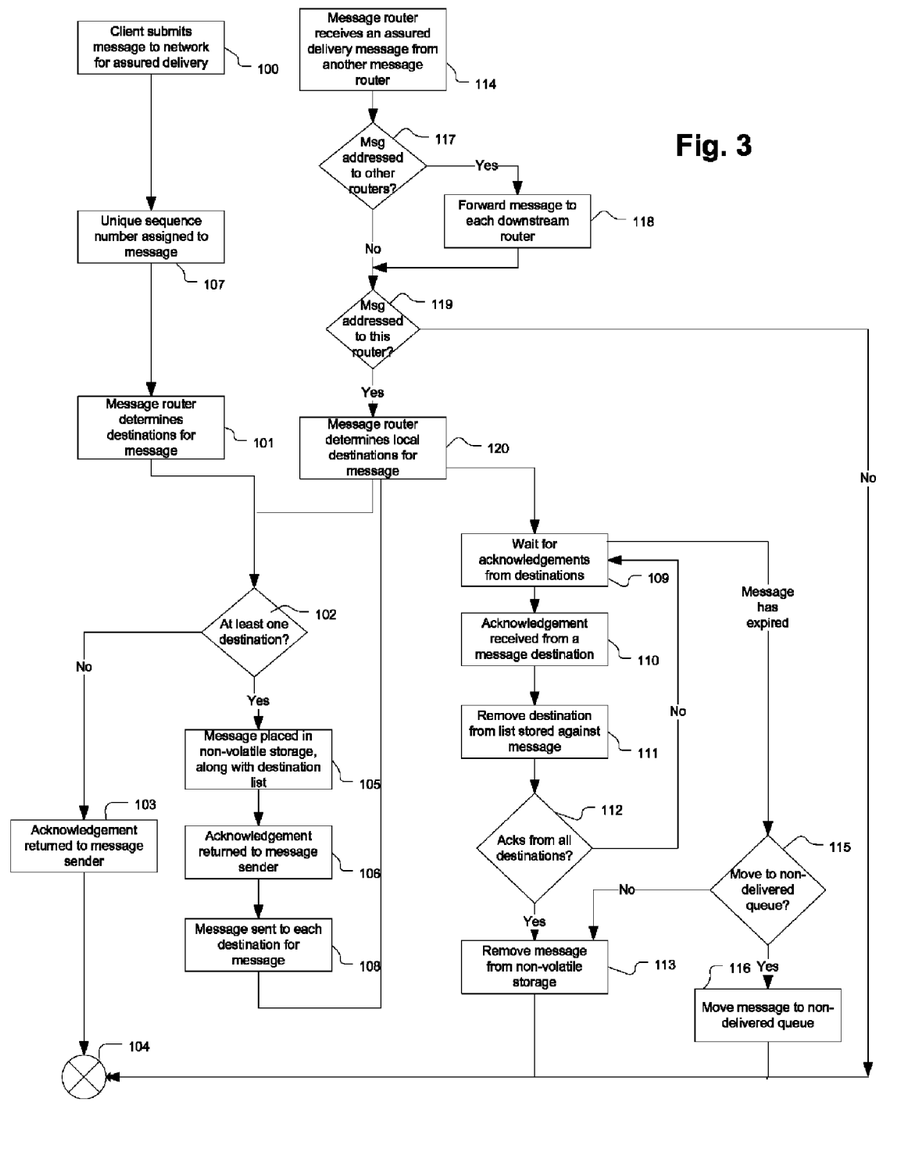
FIG. 3 is a block diagram showing the high-level logic flow for the assured delivery service.

FIG. 3 shows the high-level logic flow for the assured delivery service, first described with respect to an ingress router receiving a message from a message client for onward assured delivery. At step 100, a messaging client, such as 15, that wishes to send an assured message submits the message 31 to its associated message router, such as message router 3. This can be done in a variety of ways, such as using a well-known API such as the Java Messaging Service (JMS) API, or by submitting it over a variety of other methods as is known in the art.

At step 107, the message is assigned a unique sequence number. This sequence number is unique for all messages which this message router will originate into the network. The sequence number should be designed so that it will not wrap around for a very long period of time, and it must remain unique even across message router restarts. The preferred technique is to use a 64-bit sequence number, which starts at one, and increases by one for each new message. The last-used sequence number can be stored in persistent storage 43 or shared persistent storage 51 so that it can be remembered across power failures, message router restarts, etc.

At step 101, message router 3 determines the destinations for the message. If content-based routing is utilized, then through the content-based routing protocols described in U.S. application Ser. No. 11/012,113, content router 3 can determine the set of destinations for the message 31. This will consist of any local clients (in this example client 15) and any remote message routers (in this example routers 4 and 10) which require the delivery of the message 31. Note that the invention functions the same if other techniques, such as destination queues or topics, are used in place of, or in addition to, full content-based routing.

At decision point 102 a check is made to see if there are any destinations for the message 31. If not, then step 103 is reached, and an acknowledgement is sent to message originator 15 to indicate that the message has been accepted by the network (but in this case there is nowhere to deliver the message). Processing then ends at step 104. If at decision point 102, there is at least one message destination, then step 105 is reached.

At step 105, the message, along with the list of destinations (local client 30 and message routers 4 and 10) are placed into non-volatile storage in such a way as to ensure that the message is not lost under various failure scenarios, including loss of power, failure of the message router itself, etc. In the simplest form, this step consists of writing the message to local disk storage. The message router 3 should ensure that the data is physically written to the media before this step completes if the quality of service is to be completely assured delivery. If a slightly lesser quality of service can be tolerated, another option is to write the data to the disk in an asynchronous manner, but in this case if a failure occurs before the information has been physically written to disk, information can be lost. Such techniques are well known in the art.

At step 106 an acknowledgement is returned to the message sender (such as client 15) to indicate that the message router has now taken responsibility for the message and will delivery it to any required destinations.

At step 108, the message is sent to required next-hop destinations. In the example stated previously (FIG. 1), with respect the message router 3, a copy of the message is delivered to client 30, and a copy is delivered to message router 5 for onwards delivery to message routers 4 and 10. Note that this message is explicitly addressed to message router 4 and 10, i.e. due to the way that routing is done as per U.S. application Ser. No. 11/012,113, message router 3 has determined the set of local clients requiring the message as well as the set of remote message routers requiring the message.

At step 109, message router 3 waits for an acknowledgment from each entity to which it sent a copy of the message, which is client 30 and message routers 4 and 10 in this example. Note that even though the message went via other message routers on its way across the network to reach message routers 4 and 10, those other message routers (such as 5 and 7) are not involved in the logic for assured delivery of the message if the message is not addressed to them.

At step 110, an acknowledgement is received for the message from a given destination. This leads to step 111, which removes that destination from the list which is maintained against the message (described above in step 105). Then, at step 112, a check is performed to see if an acknowledgement has now been received for all destinations. If not, step 109 is reached to wait for further acknowledgements. When all acknowledgements for the message have been received, step 113 is reached, where the messages and the associated meta-data can be removed from non-volatile storage, and then the process completes at step 104.

Note that the above-described flow is only with respect to a single message, and the message router performs such logic for many messages in parallel.

When a message router, such as 5, 4, 7 or 10, receives a message from another message router, the receiving message router performs similar logic as described above, with a few modifications. Processing begins at step 114 when the message router receives a message from another message router, as opposed to a locally attached client submitting a message as previously described. In decision point 117, a check is made to see if the message is addressed to other routers. If so, step 118 is reached, and the message is forwarded downstream to all other message routers which are destinations for the message. Note that this step is performed first to allow the message to be routed elsewhere in the network with minimal latency. Then, in either case, decision point 119 is reached, where a check is made to see if the receiving message router is a destination for the message. If not, step 104 is reached and processing is complete. Note that in this case, the receiving message router is only an intermediate message router, and did not have to perform any special functions related to assured delivery, and rather simply performs the standard functions associated with message routing.

If the receiving message router is a destination for the message, then at step 120, the set of destinations is only determined for locally attached clients. Since the ingress router has already taken care of routing the message to all required message routers in the network, a destination message router only needs to determine the local set of clients which require the message. Processing continues through steps 102 and 103 or 105 as previously described. At step 106, after the message and the associated destination list is placed in non-volatile storage, an acknowledgement is sent back to the message router from which the message was sent, which in this example was message router 3. In this way, the egress message router (4 or 10) takes responsibility for the message for its set of clients.

This allows the ingress message router 3 to free up resources once it has received an acknowledgement from each egress message router (4 and 10) as well as for all its clients which need the message. Note that while FIG. 3 indicates that this acknowledgement is sent immediately, the acknowledgement can be sent at a later time, and multiple acknowledgements can be bundled together to reduce network traffic. This is explained in detail later. The rest of the logic of FIG. 3 for an egress router (4 or 10) is the same as previously described above.

It should be noted that in addition to assured delivery service (persistent messages), the network can also provide a non-persistent message delivery service. Whether persistent or non-persistent operation is required can be specified on a message-by-message basis. In the logic of FIG. 3, for a non-persistent message, then the logic of step 105 and step 113 can use volatile storage instead of non-volatile storage, since it is acceptable for a non-persistent message to be lost in failure scenarios. Moreover, for a non-persistent message, the message router can implement additional logic to time out a message if the acknowledgements are not received in a reasonable period of time. In this way, if a destination message router or a destination client is off-line for an extended period of time, the message can be flushed from storage to recover resources.

For a persistent message, a non-acknowledged message can also be optionally timed out by the message router if it is not acknowledged within a period of time, which is typically longer than for a non-persistent message. The optional timeout can be determined by the sender of the message indicating the expiry time of the message, or through a policy configured on the message router. When a persistent message is timed out, it can be either deleted completely, or it can be moved to another queue in the router which is used to hold messages which could not be successfully delivered. This can allow another application to receive messages from this non-delivered queue and take action on them. This is shown in FIG. 3. At step 109, while the message router is waiting for all acknowledgements for the message, if the message timeout is reached, decision point 115 is reached, where a check is made to see if the message should be moved to the non-delivered queue. For example, this check can be determined based on a configured policy, or through an option which is provided by the sender of the message. If the message is not to be maintained, then step 113 is reached, and the message and associated meta-data is removed from non-volatile storage. Otherwise, step 116 is reached, and the message and associated meta-data is moved to a non-delivered queue. Then, the process completes at step 104.

Figure 4:
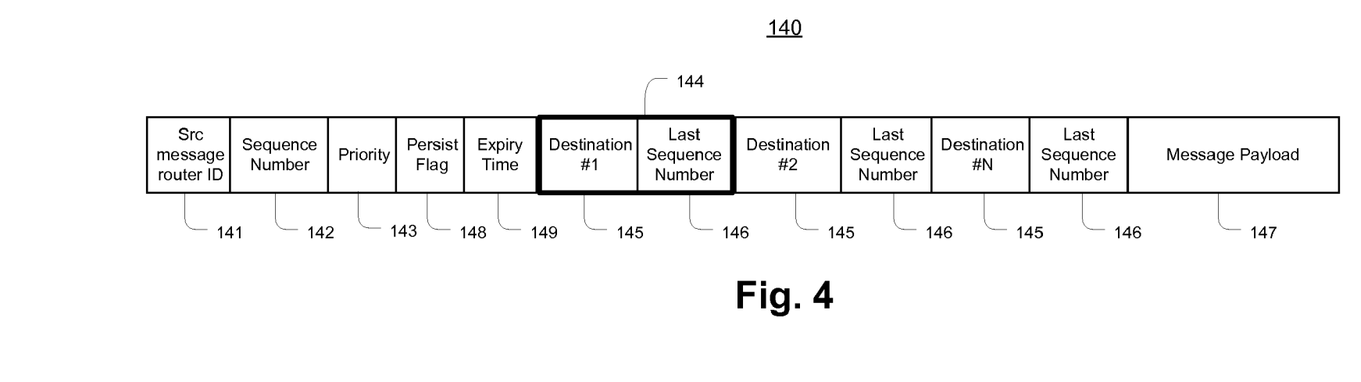
FIG. 4 shows a message format for assured message delivery between message routers.

FIG. 4 shows a message format 140 which can be used when a message is delivered between message routers. Field 141 carries the unique identifier of the message router which is originating this message into the network. This can be an IP version 4 address, an IP version 6 address, an IP address plus a port number, or any other unique identifier. Field 142 carries the unique sequence number assigned to the message in step 107. Note that the combination of fields 141 and 142 together specify a unique identifier for this message being delivered.

Field 143 carries the priority for the message. For example, a message may be assigned a priority by a number of means, such as having the priority specified by the client that originated the message, having the priority determined by an inspection of the message contents, assigning the priority through some other policy, etc. In the preferred embodiment, there are four priority levels numbered 1 through 4, but it will be understood that any number of priority levels can be supported. Field 148 contains a flag indicating whether the message is persistent or non-persistent, as described above. Additionally, field 148 can include an option indicating whether the message is to be simply deleted or placed in a non-delivered queue if the message should be timed out. Field 149, which is optional, contains an expiry time for the message (which can be expressed in different manners, such as elapsed time (expressed in units such as seconds) or a date and time). The message then has a list of one or more tuples 144 specifying information related to each destination message router. In each tuple 144, there is a destination identifier 145, specifying a destination message router, and the last sequence number 146 for the last message of the same priority sent to the same destination message router from the source message router 141. Note that a last sequence number value of zero indicates that there is no previous sequence number. In the example described earlier, where message router 3 sends a message addressed to message routers 4 and 10 via message router 5, the message would have two destination message router IDs when it is sent from message router 3, specifying message routers 4 and 10. Finally, the actual message being delivered in placed in field 147.

When a message router such as 3 routes a series of messages into network 2, network 2 must detect lost messages and ensure that messages are delivered in-order within a given priority level. Each message that is originated by a message router, such as 3, due to receiving messages from attached clients such as 15, 16, 17 or 30, is given a unique sequence number 142 as described above. However, a given destination message router, such as 4 or 10, only receive a subset of the messages originated by message router 3, according to the interests of the clients attached to those message routers. Moreover, as described above, a given message can be sent to multiple destination message routers as indicated by the presence of multiple destination tuples 144. The use of the last sequence number field 146, on a per-destination basis, allows a given destination to determine the sequence number of the previous message that it should have received at a given priority level. In this way, lost or out of order messages can be determined.

As example of the use of sequence numbers is shown in the table below. Some of the messages from message router 3 go just to message router 4, or just to message router 10, or to both. A value of "not present" in the last sequence number column indicates that the message was not sent to that destination message router.

| Seq # (142) Assigned by Message Router 3 to Message | Message Priority (143) | Destination Message Router 4 Last Sequence Number (146) | Destination Message Router 10 Last Sequence Number (146) |
| --- | --- | --- | --- |
| 1 | 1 | 0 | Not present |
| 2 | 1 | Not present | 0 |
| 3 | 2 | 0 | 0 |
| 4 | 1 | 1 | 2 |
| 5 | 2 | 3 | 3 |
| 6 | 1 | Not present | 4 |

FIG. 5 shows the acknowledgement message 200 which is sent between message routers. While acknowledgement 200 is shown as an XML message as the preferred format, it will be understood that there are a large number of different formats which can be utilized. In acknowledgement 200, field 201 provides the identifier 212 of the message router which is sending the acknowledgement 200. The acknowledgement 200 can contain acknowledgement information for one or more message routers. This allows a message router to send a single acknowledgement message which is addressed to a number of message routers, and each addressed message router can extract the portion of acknowledgement information which pertains to it. It will be understood that the acknowledgement 200 can also only be addressed to a single message router and only contain acknowledgement information for that router. Thus, a message router has the choice of sending a single acknowledgement 200 addressed to multiple other message routers, or send individual acknowledgements 200 addressed to each individual message router.

Field 202 contains acknowledgement information for the message router identified in field 214. The acknowledgement information for a given target message router 214 contains a block of acknowledgment information 203 related to persistent messages, and a block of acknowledgement information 207 related to non-persistent messages. Each acknowledgement block 203 or 207 contains a number of priority entries 204, one per message priority supported. The priority entry 204 contains a field 205 which indicates the message priority (e.g. 1 through 4) for the acknowledgement information, and a last index field 206 indicating the sequence number of the last message for this priority and message type (persistent or non-persistent) from message router 214 which has been accepted by the message router 212.

Field 209 indicates the identifier of the next message router to which acknowledgement information is being sent to, with a persistent acknowledgement block 210 and a non-persistent acknowledgement block 211 containing acknowledgement information 204 per priority as described above.

Each acknowledgement message 200 contains the last index of messages received at all priorities (for persistent and non-persistent messages), even if no new messages have been received at a particular priority since the last acknowledgement message 200 has been sent. This allows the acknowledgement message 200 to carry the complete state information each time it is sent.

Figure 6:
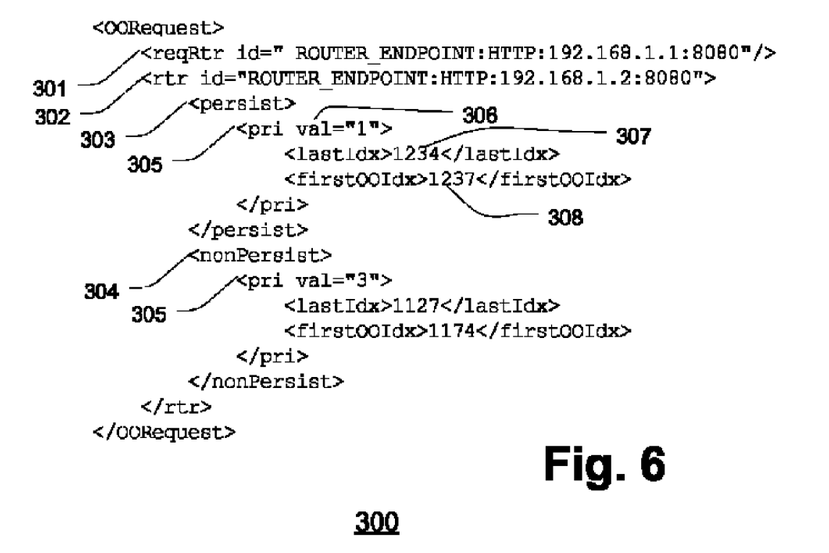
FIG. 6 shows the format for the out of order message sent between message routers.

FIG. 6 shows the out of order request message 300 which is sent between message routers to recover from lost messages. Out of order request 300 is sent by a message router when it believes that it is missing one or more messages. Field 301 indicates the identity of the message router sending the out of order request message 300. Field 302 indicates the message router which is being requested for missing messages. Field 303 is an optional field consisting of information relating to missing persistent messages. Field 304 is an optional field consisting of information relating to missing non-persistent messages. Field 303 and 304, if present, contain one or more priority entries 305; one 305 entry provides information related to a given message priority 306. Field 305 provides a last index value 307 and a first out of order index 308. The last index value 307 indicates the sequence number of the last in-order message from message router 301 accepted by message router 302 at the indicated priority 306. The first out of order index 308 indicates the sequence number of the first message received out of order by message router 302 from message router 301 at the indicated priority 306.

Figure 7:
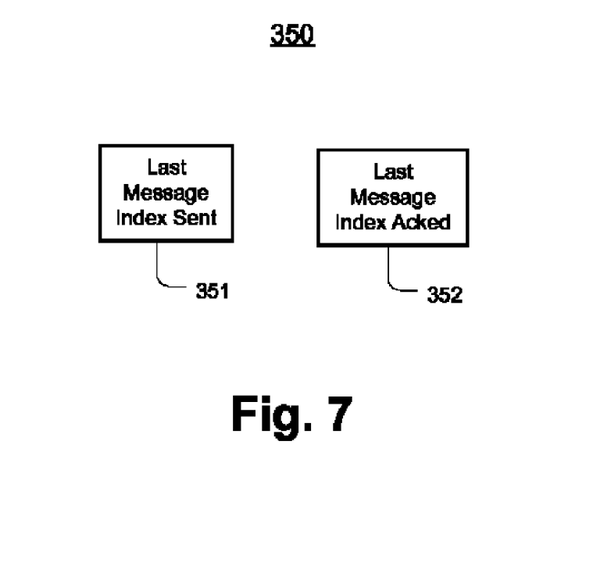
FIG. 7 shows information maintained for each message priority and destination message router combination.

FIG. 7 shows the key information 350 that is maintained at each message router related to messages that are being sent from this message router to other messages routers in the network. An instance of information 350 is maintained for each unique (destination message router, priority, message persistence type) tuple. If four message priorities are supported, then there are four instances of information 350 per destination message router per persistence type present in the network 2. The last message sent index 351 keeps track of the sequence number of the last message sent to the destination message router at the message priority for that persistence type. The last message index acked 352 keeps track of the sequence number of the last message which has been acknowledged by the destination message router for the message priority for that persistence type.

Figure 8:
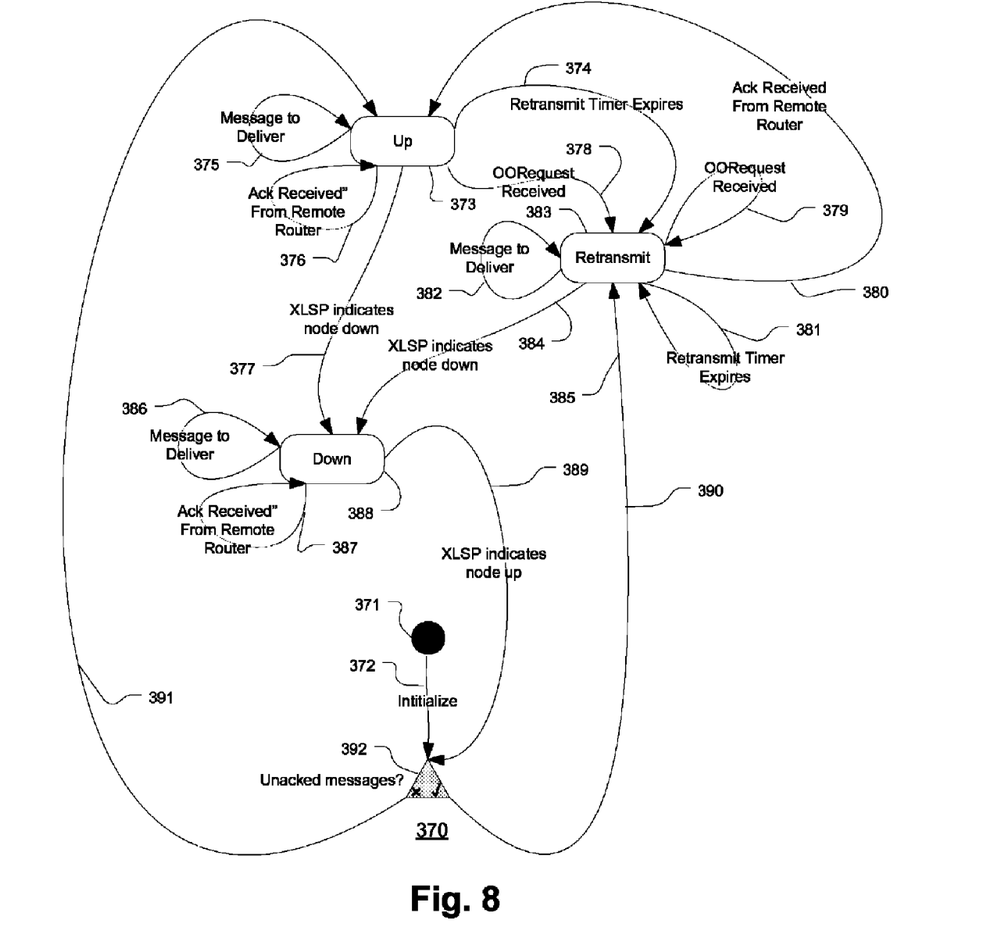
FIG. 8 shows the processing logic for sending messages from a message router.

FIG. 8 shows the processing logic 370 which is utilized by a message router to keep track of message flows and maintain information 350. There is one instance of logic 370 for each unique (destination message router, priority, persistence type) tuple, and logic 370 uses the information 350 for the same (destination message router, priority, persistence type) tuple.

Processing logic 370 starts at point 371. It will be understood in the following description that the discussion is with respect to a given (destination message router, priority, persistence type) tuple. The initialization path 372 is followed, in which last index message sent 351 and last message index acked 352 are loaded from persistent storage 43 or shared persistent storage 51. Then, decision point 392 is reached, which checks if there are any unacknowledged messages. If last index message sent 351 and last message index acked 352 are equal, then all messages have been acknowledged and path 391 is taken to state Up 373. Otherwise, Retransmit 383 state is entered.

In the Up state 373, if a new message arrives from a client to be delivered to the destination message router, last message index sent 351 is set to the sequence number 142 for the message, and the retransmission timer is started (with a default duration of 3 seconds, although it is understood that this value can be varied) if not already running. It should be noted that due to the fact that a message 140 can be sent to multiple destinations, then multiple instances of logic 370 can process the above step, and then the message will be physically sent.

In the Up state 373, if an ack message 200 is received from the remote message router, then path 376 is executed, which updates the last message index acked 352 from field 206 from the appropriate instance of field 204 for the message router 214 and the priority 205 of interest. The retransmission timer is stopped, and if there still remain unacknowledged messages (last index message sent 351 and last message index acked 352 are not equal), then the re-transmission timer is re-started. Newly acknowledged messages can now be removed from persistent storage, along with the associated meta-data, as described earlier. Note that the ack message 200 contains acknowledgement information for a number of priorities, so the above action is taken for each instance of logic 370 related to each priority present.

In the Up state 373, if an out of order request message 300 is received, then path 378 is executed. This path updates last message index acked 352 from last index field 307 of the out of order request message. Then, the retransmit timer is stopped (if running) and the Retransmit 383 state is entered.

If in the Up state 373 the re-transmission timer expires, indicating that one or more recently sent messages have not been acknowledged in time, then the Retransmit 383 state is entered.

On entry to the Retransmit 383 state, there is one or more messages that must be re-transmitted, as indicated by last message index acked 352, and either last message index sent 351 in the case of a retransmit timer expiry, or first out of order index 308 in the case of an out of order request message 300. These messages are re-sent, and the retransmit timer is started.

In the Retransmit state 383, if a new message is to be sent, then the same logic is followed as already described for path 375.

In the Retransmission state 383, if an out of order request message 300 is received, then path 379 is executed, which carries out the same logic as path 378.

In the Retransmission state 383, if an ack message 200 is received from the remote message router, then path 380 is executed, which carries out the same logic as path 376. The Up 373 state is then entered.

If in the Up state 373 an indication is received from the XSLP routing protocol (refer to U.S. application Ser. No. 11/012,113) that the remote message router is no longer reachable, then path 377 is executed, which stops the retransmit time (if running) and enters the Down state 388. Similarly, if in the Retransmit state 383, if an indication is received that the remote message router is no longer reachable, then path 384 is executed, which stops the retransmission time (if running), and aborts the re-sending of any messages that may be in progress. The Down 388 state is then entered.

In the Down 388 state, if a new message arrives from a client to be delivered to the destination message router, last message index sent 351 is set to the sequence number 142 for the message. Note that the message will not be sent to this particular destination router since it is not reachable, but the messages may still be sent to other destination message routers.

In the Down 388 state, if an ack message 200 is received from the remote message router, then it is processed as previously described. Note that although the message router in question is now unreachable, the ack message may have already been in transit and thus was successfully received and is thus processed.

In the Down 388 state, if an indication is received from the XSLP routing protocol that the message router is now reachable, then path 389 is executed and decision point 392 is reached, which has already been described.

Figure 9:
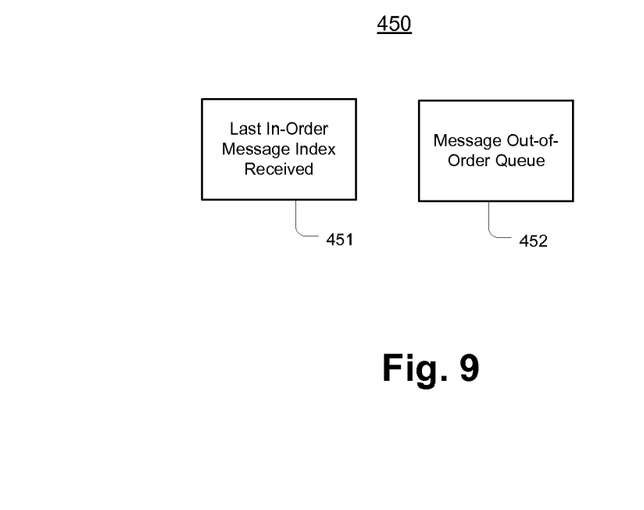
FIG. 9 shows information maintained for each source message router, message priority, and message persistence type combination.

FIG. 9 shows the key information 450 that is maintained at each message router related to messages that are being received at this message router (i.e. addressed to this message router) from other messages routers in the network. An instance of information 450 is maintained for each unique (source message router, priority, message persistence type) tuple.

When a message 140 is received that is addressed to this message router (through the message router appearing in one of the destination 145 fields), the correct instance of information 450 is accessed based on the tuple of (source message router ID 141, Priority 143, persist flag 148) from message 140.

If the last sequence number 146 of the message (for the destination tuple 144 related to this destination message router) is equal to the last in-order message index received 451 value, then the received message is the next one in sequence for this (source message router, priority, message persistence type) tuple. In this case, the last in-order message index received 451 field is updated to the message sequence number 146, and the message can be processed immediately, which includes storing the message and associated meta-data into persistent storage as previously described for persistent messages, and delivered to available destinations as previously described. If the out-of-order queue 452 is not empty, then the first (lowest sequence number message) is examined to see if it is now the next in-order message, and if so, it is removed form the queue and processed. This logic repeats until an out-of-order message is found or the queue becomes empty. The last in-order message index received 451 field is updated as messages are removed from the queue 452 for processing. If there are still out-of-order messages, the out-of-order request timer is started.

If the last sequence number 146 (for the destination tuple 144 related to this destination message router) is greater than the last in-order message index received 451 value, then there is one or more missing messages, and the new message cannot be processed immediately. The message is placed onto the out-of-order queue 452 (which is sorted by ascending sequence number 142, with duplicates discarded). An out-of-order message timer is started (if not already running) with a default duration of 3 seconds, although it will be understood that this value can be made different, including using techniques such as adjusting the timer value using an exponential back-off as is known in the art. The message is also stored in persistent storage with associated meta-data.

If the last sequence number 146 (for the destination tuple 144 related to this destination message router) is less than the last in-order message index received 451 value, then the new message is a duplicate and it is discarded.

If the out-of-order request timer expires, then an out-of-order request message 300 is sent to the source message router, indicating the last message received in order (from 451) and the first out-of-order message received (the sequence number of the message at the front of queue 452, i.e. the lowest sequenced out-of-order message). This will trigger re-transmissions by the source message router as previously explained. The out-of-order request timer is then restarted.

The XLSP routing protocol, discussed earlier, can also provide an indication that the source message router of interest is no longer reachable. In this case, any out-of-order request timers related to that source message router (across all message priorities and message persistence types) are stopped. When XSLP indicates that the source router is again reachable, the out-of-order request timers are re-started as needed, based on outstanding out-of-order messages (non empty queue 452) for each message priority and persistence type for that source message router.

The destination message router generates acknowledgement messages 200 on a timed basis, such as every 3 seconds. A single ack timer can be run, since as explained earlier, a single acknowledgement message 200 can serve to acknowledge all source messages to routers for all priorities and persistence types. When the acknowledgement timer expires, an acknowledgment message 200 is created. For each source router for which at least one new message 140 has been received since the sending of the last acknowledgement message, acknowledgement information is added for that source message router as previously described. For each (source message router, priority, message persistence type) tuple, the last-in-order message index received 451 value provides the acknowledgement sequence number 206 value. The acknowledgement message is then sent, and the acknowledgement timer is restarted. As an option, every source message router can be included in the acknowledgement message 200 even if no new messages have been received from that message router since the last acknowledgement message 200 was sent.

Note that even though the acknowledgement timer has not yet expired, an acknowledgement message 200 can be sent early based other conditions, such as the number of messages received since the last acknowledgement message 200 was sent, or based on the cumulative size of messages received since the last acknowledgement message 200 was sent. This allows acknowledgement message 200 to be sent more frequently in high traffic situations. If the acknowledgement message 200 is sent early, the acknowledgement timer is stopped and re-started in order to re-start the timing duration.

As a further optional optimization, the algorithm utilized for an egress message router, as per FIG. 3, can be further optimized to remove the need for writing the message to persistent storage 43 or shared persistent storage 51 in cases where all receiving locally-attached applications for the message acknowledge the message in a short period of time. This allows the egress message router to perform less work, and thus achieve higher message throughput and reduced message delivery latency. As described above, the egress message router only performs assured message delivery logic on behalf of it's locally attached subscribing applications. The modified algorithm in shown in FIG. 10. Note that much of the logic has already been described for FIG. 3.

Figure 10:
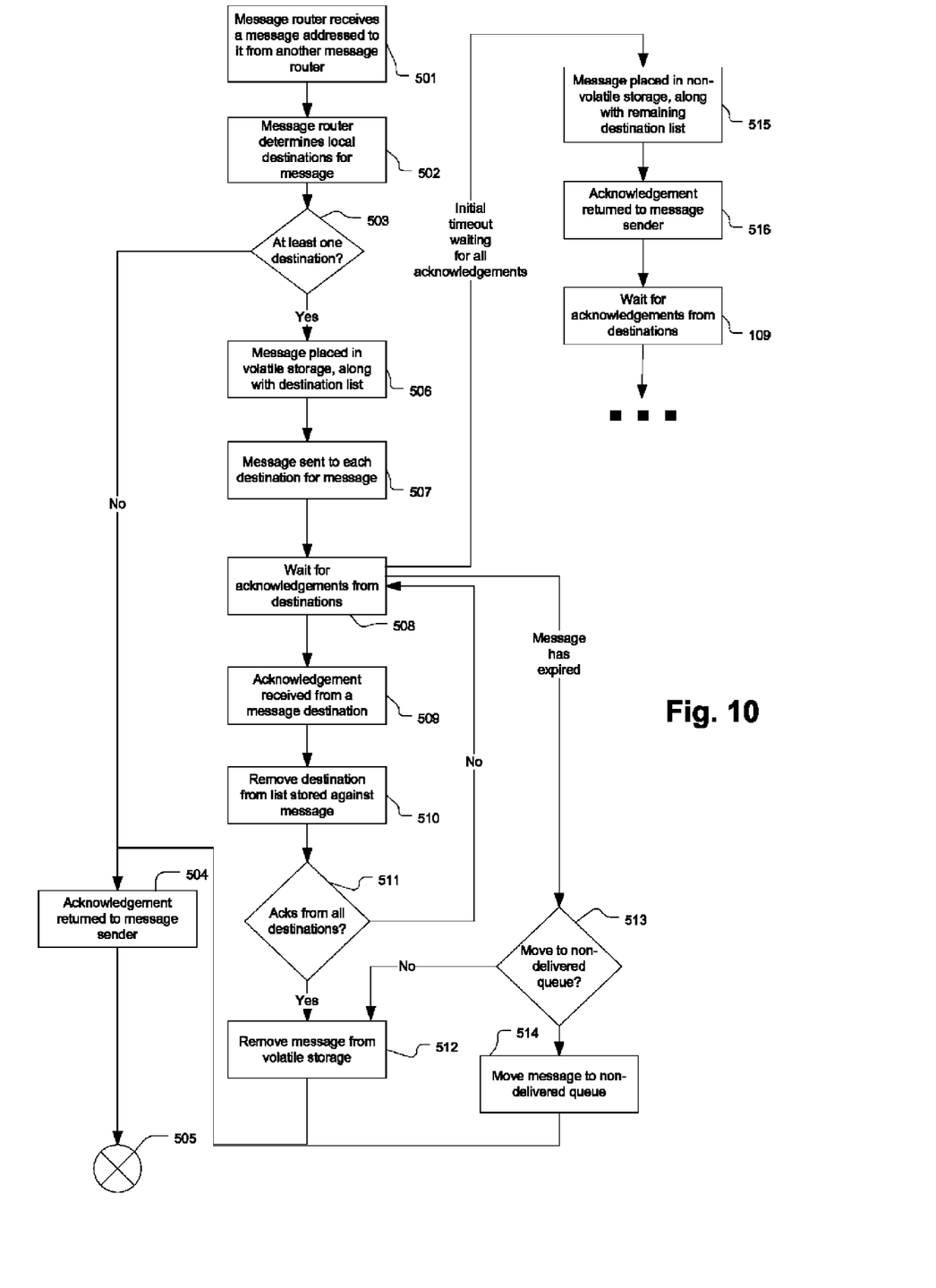
FIG. 10 is a block diagram showing the high-level logic flow for the assured delivery service with an additional optimization.

In FIG. 10, the process starts at step 501 when the egress message router receives a message addressed to it from another message router. Note that this step is a simplification of steps 114, 117, 118 and 119 of FIG. 3 which have already been described and are not repeated here. At step 502, the egress message router determines the set of locally-attached subscribing applications for the message. At decision point 503, a check is made to see if there is at least on destination subscribing application. If not, then at step 504 an acknowledgement is sent to the sending message router (the ingress message router), and the processing completes at step 505.

If there is at least one destination subscriber, then step 506 is reached. The message and the destination list for the message (and any other meta-data) is stored in volatile storage (such as memory 41), as opposed to being stored in persistent storage 43 or shared persistent storage 51 at this stage. Since the message has not been placed into persistent storage, an acknowledgement is not sent to the message sender at this point. If the egress message router fails at this point, since it has not acknowledged the message, the message sender will know to send it again to the egress message router.

At step 507, the message is then sent to each required message recipient. At step 508, the egress message router waits for acknowledgements from the local subscribers of the message. At step 509, an acknowledgement is received from a subscribing application. At step 510, the destination that acknowledged the message is removed from the list of destinations that is stored along with the message in volatile storage 41. At step 511, a check is made to see if all acknowledgements have been received. If so, step 512 is reached and the message and associated meta-data is removed from volatile storage 41. Then, at step 504, an acknowledgement is now sent to the message sender, and processing completes at step 505. Note that in this scenario, where all the acknowledgements were received in a timely manner, the message and the associated meta-data was not placed into persistent storage 43 or 51.

At step 508, while waiting for acknowledgements, if the message expires as previously described, then decision point 513 is reached. A check is made as previously described for step 115 (FIG. 3) whether the message should be moved to the non-delivered queue. If not, step 512 is reached, where the message and associated meta-data is removed from volatile storage 41. Then, at step 504 an acknowledgement is sent back to the sender and processing completes at step 505.

If the message is to be moved to the non-delivered queue, then step 514 is reached. Here, the message is moved from volatile storage 41 to the non-delivered queue in persistent storage 43 or 51. Then, an acknowledgement is returned to the message sender at step 504, and processing completes at step 505.

At step 508, while waiting for acknowledgements, a timer is run to determine when the acknowledgements are taking too long and it is time to migrate the message into persistent storage. The timer value can be a short amount of time, such as 3 seconds (the duration of this time is configurable). During this period, the egress router has not acknowledged the message to the ingress router, and so the ingress router is maintaining the message in persistent storage and the egress router has not written the message to persistent storage. If the timer expires before all acknowledgments have been received by the egress message router, then step 515 is reached. At step 515, the message and associated meta-data (such as the remaining destinations that have not yet acknowledged the message) is moved to persistent storage 43 or 51. At step 516, an acknowledgement is then sent to the message source, since the message is safely stored in persistent storage. Then, processing continues at step 109, which has previously been described in FIG. 3, and other subsequent steps of FIG. 3, which have already been described and are not shown again in FIG. 10.

With this modified approach, the egress message router avoids writing the message to persistent storage as long as the message is delivered to the required subscribers and acknowledgements are received from each subscriber in a short period of time. However, if the message cannot be delivered to at least one subscriber, or if an acknowledgement is not received from at least one subscriber in a short period of time, then the message is migrated to persistent storage, which allows the ingress router to free the message from its persistent storage as long as it has now received all required acknowledgements.

Note that with the modified approach of FIG. 10, the receiving applications may receive a message more than once. If the egress messages router delivers a message to an application, and then crashes, the ingress message router will re-deliver the message to the egress message router, and it in turn will re-deliver the message to the required attached subscribing applications. With the persistent check-pointing done in the approach of FIG. 3, the egress message router has a persistent view of which attached applications have acknowledged the message and which have not, and thus, after recovering from a failure, only re-sends the message to applications which have not previously acknowledged the message.

The approach of FIG. 10 could also be applied to the ingress message router; however this would mean that the original sending application would receive a delayed acknowledgement for the message. A downside of this is that some sending applications block after sending the message to wait for an acknowledgement from the ingress message router. In such a case, the message throughput for the sending application would be reduced. This is not an issue if the sending application using asynchronous sending techniques. It is also not an issue when applied to the egress message router, as the ingress message router sends messages and receives acknowledgements in an asynchronous manner as previously described.

It will be appreciated that an exemplary embodiment of the invention has been described, and persons skilled in the art will appreciate that many variants are possible within the scope of the invention.

All references mentioned above are herein incorporated by reference.

We claim:
1. A method of providing assured message delivery in a network of routers, comprising:
 a) receiving an incoming message from a client at an ingress router;
 b) assigning a sequence id to the incoming message at the ingress router, wherein the sequence number increments for each new message received by the ingress router;
 c) identifying at the ingress router from the content of the incoming message each destination local subscriber attached to the ingress router and each destination egress router to which the received message is to be delivered, wherein each destination egress router has local destination subscribers destined to receive the incoming message;
 d) storing the incoming message in persistent storage at the ingress router along with each identified destination local subscriber attached to the ingress router and each identified destination egress router;
 e) creating at the ingress router, after the incoming message has been stored in persistent storage, an acknowledgement message for sending to the client accepting responsibility for delivery of the received message;
 f) sending the acknowledgement message to the client;
 g) sending the incoming message to each identified destination local subscriber and each destination egress router;
 h) awaiting an acknowledgement message at the ingress router from each identified destination local subscriber attached to the ingress router and each identified destination egress router indicating that the message has been successfully received thereby;
 i) removing each destination from persistent storage as an acknowledgement message is received from that destination; and
 j) removing the incoming message from persistent storage when an acknowledgement message has been received from each destination local subscriber attached to the ingress router and each identified destination egress router; and
 k) upon receipt of the incoming message at each router in the network downstream of the ingress router,
  (i) first making a determination as to whether the incoming message is addressed to other routers, and if yes forwarding the message to each downstream router that is a destination for the message; and
  (ii) second making a determination as to whether the incoming message is addressed to that router as an egress router, and if not taking no further action in respect of the incoming message; and
 wherein each egress router:
  (i) identifies the local destination subscribers for the message received from the ingress router that are attached to that egress router;
  (ii) stores the message received from the ingress router in volatile storage along with each identified local destination subscriber for that egress router;
  (iii) after storing the message received from the ingress router in volatile storage along with the local destination subscribers attached to that egress router, sends the incoming message to each local destination subscriber;
  (iv) awaits an acknowledgement message from each identified local subscriber;
  (v) as an acknowledgement message is received from each local destination subscriber, removes that local destination subscriber from volatile storage;

(vi) removes the message received from the ingress router from volatile storage when acknowledgement messages have been received from all the local destination subscribers within a predetermined time and sends an acknowledgement message to the ingress router;

(vii) if acknowledgement messages have not been received from all the local destination subscribers within the predetermined time, stores the message in persistent storage along with the remaining list of local destination subscribers;

(viii) after storing the message received from the ingress router in persistent storage along with the remaining local destination subscribers attached to that egress router, sends an acknowledgement message to the ingress router;

(ix) awaits an acknowledgement message from each remaining identified local destination subscriber attached to that egress router;

(x) as an acknowledgement message is received from each local destination subscriber, removes that destination from persistent storage; and (xi) removes the message received from the ingress router from persistent storage when an acknowledgement message has been received from each remaining local destination subscriber attached to that egress router.

2. The method of claim 1, wherein the persistent storage is shared among a plurality of ingress routers.

3. The method of claim 1, wherein the message sent form the ingress router carries priority information associated with the message.

4. The method of claim 3, wherein the acknowledgement message sent from each egress router to the ingress router contains the highest acknowledged sequence number for each message persistence type and message priority.

5. The method of claim 4, wherein said acknowledgement messages are sent on a timed basis.

6. The method of claim 4, wherein acknowledgement messages are sent based on the number of messages received since the last acknowledgement message was sent.

7. The method of claim 4, wherein the acknowledgement messages are sent based on the cumulative size of messages received since the last acknowledgement message was sent.

8. The method of claim 1, wherein the message sent from the ingress router carries an identifier for the ingress router.

9. The method of claim 8, wherein the message sent from the ingress router carries an identifier for the destination egress router and a sequence number of a previous message for that destination egress router and message priority.

10. The method of claim 9, wherein the message sent from the ingress router carries multiple destination egress router identifiers, each with its own previous message sequence number.

11. The method of claim 1, wherein the message sent from the ingress router carries an indication of whether it is a persistent or non-persistent message.

12. The method of claim 1, wherein the destination egress router uses the last sequence number to determine if a message has been lost.

13. The method of claim 12, wherein the destination egress router sends an out-of-order request message to the ingress router to request transmission of missing messages.

14. The method of claim 13, wherein the out-of-order message is sent after a period of time elapsed from a determination that a message is missing.

15. The method of claim 1, wherein if a timeout occurs before an acknowledgement message is received from each local destination, the message and list of remaining destinations is transferred to a message queue holding messages that could not be successfully delivered.

16. A communications network comprising:

a plurality of interconnected content routers, at least some of which receive incoming messages from publishers and act as ingress routers and at least some of which are attached to local clients and act as egress routers;

a persistent storage medium associated with one or more of said routers acting as ingress routers; and each ingress router being configured to:
a) identify from the content of an incoming message received from a client at that ingress router each destination local subscriber attached to that ingress router and each destination egress router, wherein each destination egress router has local destination subscribers destined to receive the incoming message,
b) assign a sequence number to the incoming message, wherein the sequence number increments for each new message received by the ingress router,
c) store the received incoming message in persistent storage at the ingress router along with each identified destination local subscriber attached to the ingress router and each identified destination egress router,
d) create an acknowledgement message after the incoming message has been stored in persistent storage for sending to the client,
e) send the acknowledgement message to the client,
f) after the incoming message has been stored in said persistent storage, send the incoming message to each identified destination local subscriber and each destination egress router,
g) await an acknowledgement message at the ingress router from each identified destination local subscriber and each destination egress router indicating that the message has been successfully received thereby,
h) remove each destination from persistent storage as an acknowledgement is received from that destination, and
i) remove the message from persistent storage when an acknowledgement has been received from each destination local subscriber and each destination egress router identified for the message, and wherein each router downstream of the ingress router receiving the incoming message is configured to:
(i) first make a determination as to whether the incoming message is addressed to other routers, and if yes forward the incoming message to each downstream router that is a destination for the message, and
(ii) second make a determination as to whether the incoming message is addressed to that router as an egress router, and if not take no further action in respect of the incoming message; and wherein each egress router is configured to:
(i) identify the local destination subscribers for the message received from the ingress router that are attached to that egress router;
(ii) store the message received from the ingress router in volatile storage at that egress router along with each identified local destination subscriber for that egress router;
(iii) after storing the message received from the ingress router in volatile storage along with the local destination subscribers attached to that egress router, sends the incoming message to each local destination subscriber;
(iv) await an acknowledgement message from each identified local subscriber attached to that egress router;
(v) as an acknowledgment message is received from each local destination subscriber, remove that local destination subscriber from volatile storage;
(vi) remove the message from volatile storage when acknowledgement messages have been received from all the local destination subscribers within a predetermined time and send an acknowledgement message to the ingress router;
(vii) if acknowledgement messages have not been received from all the local destination subscribers within the predetermined time, store the message in persistent storage along with the remaining list of local destination subscribers and send an acknowledgement message to the ingress router;
(viii) after storing the message received from the ingress router in persistent storage along with the remaining local destination subscribers attached to that egress router, send an acknowledgement message to the ingress router;
(ix) await an acknowledgement message from each remaining identified local destination subscriber attached to that egress router;
(x) as an acknowledgement message is received from each remaining local destination subscriber, removes that destination from persistent storage; and
(vi) remove the message received from the ingress router from persistent storage at that egress router when an acknowledgement message has been received from each remaining local destination subscriber attached to that egress router.

17. The communications network of claim 16, wherein each egress router is configured to transfer the message and remaining list of destinations to alternate storage at the egress router when a timeout occurs before an acknowledgement has been received from all the local destinations.

\* \* \* \* \*